United States Patent
Lynas

(10) Patent No.: US 8,215,582 B2
(45) Date of Patent: Jul. 10, 2012

(54) AIRCRAFT FUSELAGE INTERIOR

(75) Inventor: Christopher Lynas, Bristol (GB)

(73) Assignee: Airbus Operations Limited, Bristol (GB)

( * ) Notice: Subject to any disclaimer, the term of this patent is extended or adjusted under 35 U.S.C. 154(b) by 728 days.

(21) Appl. No.: 12/280,430

(22) PCT Filed: Mar. 29, 2007

(86) PCT No.: PCT/GB2007/001136
§ 371 (c)(1),
(2), (4) Date: Aug. 22, 2008

(87) PCT Pub. No.: WO2007/110647
PCT Pub. Date: Oct. 4, 2007

(65) Prior Publication Data
US 2009/0008502 A1   Jan. 8, 2009

(30) Foreign Application Priority Data
Mar. 29, 2006  (GB) .................................. 0606282.2

(51) Int. Cl.
*B64D 11/00* (2006.01)
*B64D 13/00* (2006.01)

(52) U.S. Cl. .................................................. 244/118.5

(58) Field of Classification Search ............... 244/118.5, 244/118.6, 119, 120, 129.3, 131
See application file for complete search history.

(56) References Cited

U.S. PATENT DOCUMENTS

| | | | | |
|---|---|---|---|---|
| 4,541,595 A * | 9/1985 | Fiala et al. | .................. | 244/129.3 |
| 5,044,578 A * | 9/1991 | White et al. | .................. | 244/119 |
| 5,395,074 A | 3/1995 | Hart et al. | .................. | 244/118.1 |
| 5,752,673 A | 5/1998 | Schliwa et al. | | |
| 5,816,534 A | 10/1998 | Schumacher et al. | | |
| 6,308,918 B1 | 10/2001 | Ferrier | | |
| 6,460,806 B2 * | 10/2002 | Lau et al. | .................. | 244/129.3 |
| 6,601,799 B2 * | 8/2003 | Lau et al. | .................. | 244/129.3 |

(Continued)

FOREIGN PATENT DOCUMENTS

EP   0437870 A1   7/1991

(Continued)

OTHER PUBLICATIONS

ISR and Written Opinion for PCT/GB2007/001136 dated Nov. 5, 2007.

(Continued)

*Primary Examiner* — Tien Dinh
*Assistant Examiner* — Michael A Fabula
(74) *Attorney, Agent, or Firm* — Lowe, Hauptman, Ham & Berner, LLP

(57) ABSTRACT

An aircraft fuselage interior comprises a side wall that extends in a direction along the length of the fuselage and includes an upper section that slopes inwardly. In one embodiment, the side wall comprises a multiplicity of visible elongate features, such as sloping lines, arranged along the length of the side wall. Each elongate feature extends from a lower portion to an upper portion and slopes relative to a notional line defined by the intersection of the interior surface of the side wall and a plane whose normal axis is parallel to the length of the fuselage. When viewed by a seated passenger, the sloping elongate features may cause the side wall to appear to have a degree of inward sloping less than the actual degree of inward sloping. The fuselage interior may therefore appear larger than it is.

22 Claims, 5 Drawing Sheets

U.S. PATENT DOCUMENTS

| | | | |
|---|---|---|---|
| 6,736,352 B2 * | 5/2004 | Bladt et al. | 244/129.3 |
| 6,899,299 B2 * | 5/2005 | Ritts | 244/118.5 |
| 7,121,510 B2 * | 10/2006 | Ritts | 244/118.5 |
| 7,210,655 B2 * | 5/2007 | Novak et al. | 244/119 |
| 7,658,044 B2 * | 2/2010 | Roth | 52/396.04 |
| 7,766,521 B2 * | 8/2010 | Wentland et al. | 362/471 |
| 2002/0145081 A1 * | 10/2002 | Lau et al. | 244/129.3 |
| 2004/0016847 A1 * | 1/2004 | Ritts | 244/118.5 |
| 2005/0044712 A1 * | 3/2005 | Gideon et al. | 29/897.32 |
| 2006/0102786 A1 * | 5/2006 | Granzeier et al. | 244/119 |
| 2006/0192051 A1 * | 8/2006 | Novak et al. | 244/119 |
| 2008/0185479 A1 * | 8/2008 | Brownjohn et al. | 244/129.3 |
| 2008/0266887 A1 * | 10/2008 | Wentland et al. | 362/470 |
| 2010/0078520 A1 * | 4/2010 | De Carvalho | 244/118.5 |

FOREIGN PATENT DOCUMENTS

| | | |
|---|---|---|
| EP | 0681956 | 11/1995 |
| EP | 1249391 A2 | 10/2002 |
| EP | 1375339 A2 | 1/2004 |
| EP | 1647480 A2 | 4/2006 |
| WO | 83/01237 A1 | 4/1983 |

OTHER PUBLICATIONS

British Search Report for GB0606282.2 dated Dec. 18, 2006.

* cited by examiner

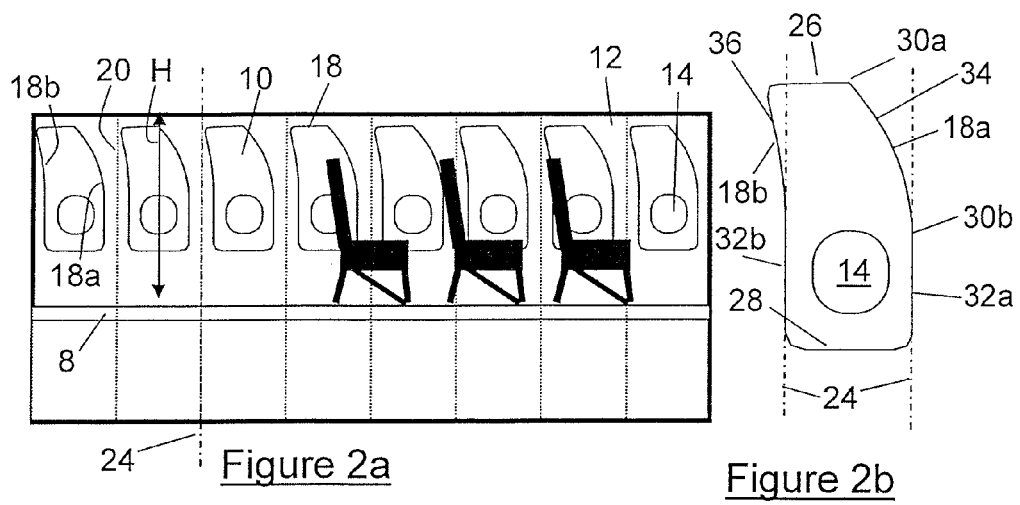
Figure 2a
Figure 2b
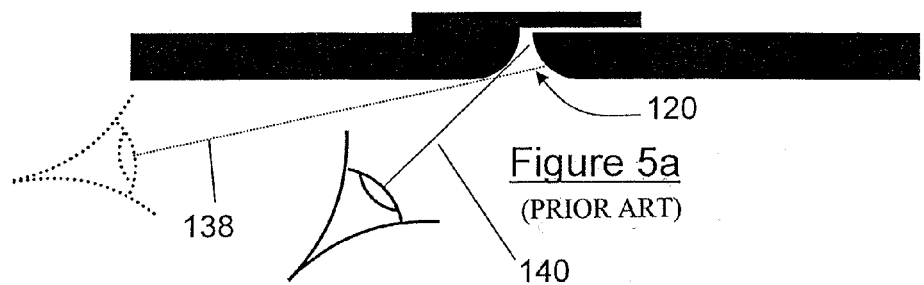
Figure 5a
(PRIOR ART)
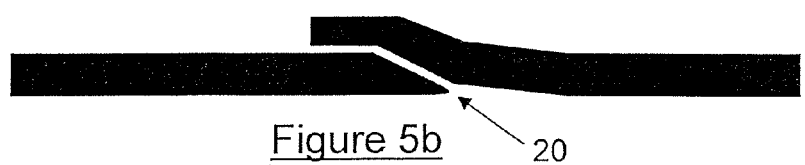
Figure 5b
Figure 5c

AIRCRAFT FUSELAGE INTERIOR

RELATED APPLICATIONS

The present application is based on International Application Number PCT/GB2007/001136 dated Mar. 29, 2007, and claims priority from British Application Number 0606282.2 filed Mar. 29, 2006, the disclosures of which are hereby incorporated by reference herein in their entirety.

BACKGROUND OF THE INVENTION

The present invention relates to the interior of an aircraft fuselage.

In aircraft fuselages of the prior art, the fuselage structure is typically generally cylindrical with a circular, or sometimes substantially oval, cross-section. FIG. 1a of the attached drawings shows a typical fuselage structure comprised of frames 102, which includes a floor structure 104. The main structure of the fuselage is formed by skins 106 attached to the frames 102. The fuselage structure is stiffened by means of stringers (or longerons—not shown in the Figures) which run parallel to the axis of the fuselage, typically being fixed to the skins on the interior surface.

FIG. 1b shows a side view from inside a fuselage having a structure in accordance with that shown in FIG. 1a. Thus, FIG. 1b shows the cabin floor 108, which is supported by the floor structure 104 (not shown separately in FIG. 1b), and an interior side wall 110 extending upwardly from the floor 108. The side wall 110 is defined by interior panels 112, each panel including a window aperture 114. FIG. 1b also shows the under-floor area 116, beneath the floor structure 104. The panels 112 have a thickness that varies across the panel. The thickness of the panel increases from the region around each window aperture 114 up to a chine line 118 that surrounds the window 114. The rate of change of the thickness of the panels 112 rapidly changes at the chine line 118 such that the rate of change of thickness at positions outside the region defined by the chine line 118 is lower than positions inside the chine line 118. The panels 112 are joined by means of panel joints 120, that in the view shown in FIG. 1b are substantially vertical. In use, passengers are seated in seats 122 arranged in rows in the fuselage. As a result of the generally round cross-section of the fuselage, the side wall 110 defined by the panels 112 curves into the cabin space inside the fuselage with increasing height. The passengers in the aircraft can therefore feel enclosed and cramped as a result of the side walls of the fuselage curving inwards, despite the relatively wide floor space. It will be appreciated that whilst the panel joints 120 appear vertical in FIG. 1b, the joints slope with the inward sloping of the side wall 110.

SUMMARY OF THE INVENTION

The present invention provides an aircraft fuselage interior comprising a side wall that extends in a direction along the length of the fuselage and includes an upper section that slopes inwardly, the side wall comprising a multiplicity of visible elongate features arranged along the length of the side wall, each elongate feature extending from a lower portion to an upper portion and sloping relative to a notional line defined by the intersection of the interior surface of the side wall and a plane whose normal axis is parallel to the length of the fuselage.

In the fuselage interior of the prior art described above the passengers are able to perceive readily the curvature of the interior walls by means of lines parallel to the notional line mentioned above, for example by means of the paneled joints and by means of the upright chine lines around the windows. It is believed that in accordance with the present invention the sloping of the elongate features makes it more difficult for a passenger in the aircraft to perceive the curvature of the side wall when looking along the length of the fuselage. In embodiments of the present invention, the arrangement of the elongate features is such that the upper section of the side wall, when viewed in at least some directions from the centre of the fuselage, appears to have a degree of inward sloping less than the actual degree of inward sloping. The fuselage interior may therefore appear larger than it is. Thus, in accordance with embodiments of the present invention it is possible to provide a fuselage interior without increasing mass or volume of the aircraft fuselage but which the passengers perceive to be wider and therefore larger.

As it is the sloping of the features that provides the benefit of this aspect of the invention, the features need not necessarily be so elongate that they would be perceived as being long and thin; the features need only be sufficiently elongate to cause the passenger to recognise a sloping of the feature relative to the notional line. For example, embodiments of the invention, that could provide the benefit of the invention, could require elongate features each having a length that is only twice as great as its width.

The visibility of the elongate features is preferably such that the features are visually prominent relative to other aspects of the side wall, for example, relative to features on the side wall that are arranged substantially parallel to said notional line. For example, the side wall may comprise joints that follow a path parallel to said notional line. In such a case, it is preferred for the visible elongate features to have a width or brightness, or other characteristic associated with visual prominence, greater than such joints. The visibility of the elongate features to passengers is important, because it is the visibility of the sloping of the elongate features that will cause passengers to perceive the internal sloping of the side walls of the cabin interior differently. Thus, elongate features that are typically hidden from view or very difficult to perceive separately from other features of the side wall are not to be considered as visible elongate features in the context of the present invention.

Preferably, at least part of the elongate feature is positioned on the upper inwardly sloping section of the side wall. In the case where the side wall includes window apertures for seated passengers to look through, at least part of the elongate features may be positioned above the average level of the tops of the window apertures. Typically, the tops of the window apertures will be roughly in line with the tops of the seats, so that most, if not all, of the window apertures in front of a seated passenger are not readily visible by the seated passenger when looking forward.

If the interior surface defined by the side wall has a cross-sectional shape that varies significantly along the length of the fuselage, then said notional line may be defined so that it is at a different position for each elongate feature. The notional line may for example be defined, for each elongate feature, as being the intersection of the interior surface of the side wall and a plane whose normal axis is parallel to the length of the fuselage and which contains the uppermost point on the elongate feature (or if there is more than one uppermost point, the foremost uppermost point).

The arrangement of elongate features is preferably such that the effect (for example, the visual effect) of the sloping of the elongate features is greater in one direction than the other. The arrangement of elongate features may for example be such that the amount of sloping of the elongate features is greater in one direction than the other. For example, the average angle of sloping in one direction may be more than the average angle of sloping in the opposite direction. The average angle of sloping in the aft direction may be ascertained by (1) identifying all visible elongate features on the side wall that slope in the aft direction, each elongate feature extending from a lower portion to an upper portion and sloping from bottom to top in the aft direction relative to said "notional line" (the line defined by the intersection of the interior surface of the side wall and a plane whose normal axis is parallel to the length of the fuselage), (2) assigning each elongate feature so identified a single average angle of sloping, the angle so assigned being calculated in the same way for each feature, and then (3) calculating the sum of all such angles so assigned divided by the number of elongate features so identified, thereby producing an overall average angle of sloping in the aft direction. The average angle of sloping in the fore direction may be ascertained by a similar method (using the same criteria for identifying the elongate features and assigning angles). The average angle of sloping assigned to a given elongate feature may be approximated by calculating the angle given by $\tan^{-1}$ (l/v), where v is the separation resolved in the vertical direction of the start and end of the elongate feature and l is the separation resolved in the longitudinal direction of the start and end of the elongate feature), such that the angle is a positive value defining an acute angle (0 to 45 degrees). Thus, assuming that there is at least one visible elongate feature sloping in each direction, the average angle of sloping in one direction will be defined by a single positive number and the average angle of sloping in the opposite direction will be defined by a different single positive number. It will of course be appreciated that the greater the difference between the average angle of sloping of visible elongate features in the aft direction and the average angle of sloping of visible elongate features in the fore direction, the easier it will be for the skilled person to recognise, without performing any calculation as set out above, that the angle of sloping in one direction is greater than the angle of sloping in the opposition direction.

The arrangement of elongate features may be such that the average angle of sloping in the aft direction is equal to the average angle of sloping in the fore direction, but that the elongate features sloping in one direction are given greater visual prominence so that the effect of the sloping of the elongate features is greater in one direction than the other.

Alternatively or additionally, there may be more elongate features sloping in one direction than there are elongate features sloping in the opposite direction.

The elongate features may all slope relative to said notional line in the same direction along the length of the fuselage, that is either fore or aft. Preferably, the lower portion of each elongate feature is forward, in said same direction, of the upper portion.

The fuselage interior may include a multiplicity of seats. The seats may all face the same direction along the length of the fuselage. Preferably the sloping of the elongate features is greater in the direction towards the seats. It will be understood that the direction of sloping is equal to the direction along the length of the fuselage from the lower portion of the elongate feature to the upper portion of the elongate feature. It will be understood that the direction towards the seats is the direction that points towards the fronts of the seats (i.e. opposite to the direction in which the seats face). Arranging the elongate features to slope towards the seats, and therefore towards passengers when seated in the seats, may provide the illusion of extra space in the fuselage interior as perceived by passengers seated in the seats. The effect of the illusion may be increased by means of arranging the elongate features such that the angle of sloping progressively increases with height up the side wall. If there exist visible elongate features that slope in the opposite direction, it is preferred that such features are less visibly prominent and/or are significantly less in number and/or density than the elongate features sloping in said same direction. Preferably, there are no other visible elongate features that slope in the opposite direction. By means of the elongate features sloping in the same direction and towards a passenger (i.e. so that the upper portion is closer to the passenger than the lower portion) it is believed that passengers will perceive the cabin space to be larger than it actually is.

At least part of the surface of the side wall (for example the upper section) that faces the interior of the fuselage may curve inwardly. At least part of the surface of the side wall that faces the interior of the fuselage may be shaped such that, with increasing distance upwards along the elongate feature, the surface gets progressively closer to the vertical plane containing the axis of the fuselage. The angle of sloping of the elongate feature relative to said notional line preferably progressively increases along the majority of the length of the elongate feature that lies on the upper section of the side wall.

The angle of sloping of the elongate feature relative to said notional line may increase at least once as the angle of sloping of the side wall towards the vertical plane increases. The elongate feature may for example include a first section inclined at a first angle to the notional line and a higher second section inclined at a second angle to the notional line, the second angle being greater than the first. Preferably, the angle of sloping of the elongate feature relative to said notional line increases as the angle of sloping of the side wall towards the vertical plane increases. The elongate feature may be so shaped that when projected onto a vertical flat surface parallel to the longitudinal axis, the projected shape includes a first section having a first radius of curvature and a higher second section having a second radius of curvature, the second radius of curvature being greater than the first. The radius of curvature of the projected shape may increase with the increase in the angle of sloping of the side wall. The radius of curvature of the projected shape may increase along at least part of the length of the elongate feature.

The elongate feature may be so shaped that when viewed from a typical viewpoint of a seated passenger in the aircraft fuselage interior, the shape defined by the elongate feature, when accounting for perspective and for the geometry of the side wall, lies on a straight line. In this context, the line may of course deviate slightly from an exactly straight line without affecting the benefit of an embodiment of this aspect of the invention.

The angle of sloping of each elongate feature may progressively increase along more than about three quarters of its length. The angle of sloping of each elongate feature may progressively increase along substantially its entire length. In the case where the surface of the side wall includes a section that faces the interior of the fuselage that is shaped such that, with increasing distance upwards, the surface gets progressively closer to the vertical plane containing the axis of the fuselage, the angle of sloping of the elongate feature relative to said notional line preferably progressively increases along substantially the entire length of the elongate feature that lies on such a progressively sloping section of the side wall.

The elongate feature may be shaped such that the separation in a direction parallel to the axis of the fuselage of the top of the elongate feature from the bottom of the elongate feature is greater than 10%, preferably greater than 20%, and more preferably greater than 30% of the length of the elongate feature. The average angle of sloping of each elongate feature relative to the notional line is preferably less than 45 degrees. Thus, each elongate feature may be shaped such that the separation in a direction parallel to the axis of the fuselage of the top of the elongate feature from the bottom of the elongate feature may be up to about 70% of the length of the elongate feature. The angle of sloping of the elongate feature of each elongate portion may vary along its length, but is preferably greater than 5 degrees on average. The angle of sloping is preferably greater than 10 degrees along the length of the elongate feature and may be greater than 15 degrees or even 20 degrees. Preferably, each elongate feature has no portion having a length equal to 20% of the height of the side wall (in the vicinity of the elongate feature) for which the portion slopes such that the separation in a direction parallel to the axis of the fuselage of the top of the portion from the bottom of the portion is greater than 80%, and more preferably greater than 50%, of the length of the elongate feature.

Each elongate feature may be defined by a line. The line may be substantially continuous or may be a broken line. The elongate features may be defined by an array or pattern of short lines or flecks that collectively define elongate sloped features. Each elongate feature may be relatively short compared to the height of the side wall, but there may be many such short elongate features that collectively achieve the same result as providing a smaller number of longer elongate features. Each elongate feature may have a length less than 10% of the height of the side wall (in the vicinity of the side wall). In the case where the elongate features are short, in order for the illusion of extra cabin space to be achieved, there needs to be sufficient number of elongate features to provide the effect on the passengers. It is preferred however that each elongate feature is longer than 10% of the height of the side wall. Preferably, the length of each elongate feature is greater than 15% and more preferably greater than 20% of the height of the side wall. Alternatively, or additionally, each elongate feature may be longer than 80% of the height of the average height of the window apertures, if such are present in the side wall. The height of the side wall may conveniently be measured as the vertical distance between the point at which the side wall meets the floor and the junction at which the side wall meets a surface inclined more to the horizontal than to the vertical. The upper point at which the height of the side wall is defined may for example be the region at which the side wall meets the overhead lockers. Alternatively, for example in the absence of a clearly identifiable junction, the top of the side wall may be defined as the point at which the wall first curves to an angle of 45° to the horizontal. In the case where there are portions such as overhead lockers, bins, the structure that supports passenger services (such as adjustable air vents, reading lights and the housing for the emergency drop-down oxygen masks) or other such portions that extend into the interior of the fuselage, at least some of the elongate features may extend as far as such portions. In such a case, it will be understood that such portions may be considered as part of the side wall. As such, the height of the side wall may be measured by deeming the upper point on the side wall as the point at which such a portion (such as the overhead luggage bins) meets the ceiling of the aircraft or the uppermost point on the portion.

The elongate features may be defined at least in part by means of surface decoration. For example, the elongate features may be defined by means of a contrasting colour or brightness of one part of the wall relative to another. The surface decoration may be formed by means of paint, tape or other substantially two-dimensional ornamentation. The elongate features may even be defined by means of a pattern of elements, such as dots, which individually are not elongate but collectively define elongate shapes.

The elongate features may be defined at least in part by means of the shape of the wall. For example, the elongate features may be defined by means of a pattern in relief, a change in gradient or any other three dimensional aspect of the wall that distinguishes the elongate feature from the rest of the wall. The feature may for example be defined at least in part by means of a chine line. It will be understood that a chine line may be defined by means of a sharp changing gradient of the wall. The elongate feature may be defined at least in part by means of three dimensional shapes defined by features of the wall that have shapes dictated at least partly by the function of another part of the aircraft. For example, the wall may cover over one or more ducts. The shape of the wall that covers the ducts and/or the shape of the ducts and/or a continuation of a shaped region of the wall that covers the ducts may form at least a part of the elongate feature. For example, the ducts may extend substantially upwards (parallel to said notional line) along the wall and include an upper portion that slopes relative to said notional line. The sloping part of the duct may be sloped solely to facilitate the provision of the benefit of the present invention.

The elongate features may be defined at least partly by other means. For example, the elongate features may be defined at least partly by means of lighting effects. It will of course be understood that the elongate features may be defined by a combination of the aforementioned possibilities. For example, where the elongate feature is defined in part by means of a chine line, extra surface decoration may be provided to emphasise the chine line.

The elongate features may be arranged along the length of the side wall in a substantially regular pattern. For example, the separation between every $n^{th}$ elongate features (where n is a cardinal number, for example 1, 2, 3 or 4) may be substantially the same. The aircraft fuselage interior, when the aircraft is finally assembled, may comprise a multiplicity of windows. As such, the aircraft fuselage interior may comprise a multiplicity of window apertures (for such windows) arranged along the length of the fuselage. The elongate features may be so arranged along the length of the side wall that the features are interspersed between such windows. Typically, the windows will be positioned vertically to be roughly in line with the heads of seated passengers so that passengers can readily see out of the aircraft when seated. As such, windows positioned forwards of a seated passenger may be at least partially obscured from view by the rows of seats in front of a given seated passenger. In such cases, elongate features may only be visible if they are positioned at least partly above the level of the tops of the windows. Thus, whilst the elongate features may be considered as being interspersed between the windows, it will be understood that the majority, if not the entirety, of the length of each elongate feature may be positioned vertically above the tops of the windows.

The interspersion of the multiplicity of elongate features amongst the window apertures may be such that there is at least one, and preferably at least two, elongate feature(s) between each pair of adjacent window apertures. There may be provided a multiplicity of elongate features between each pair of adjacent apertures, for example in the case where each elongate feature is relatively short. In certain embodiments of the invention, all visible elongate features of said multiplicity of visible elongate features are defined, at least in part, by features of the side wall other than the shape of the window apertures or parts thereof. In other embodiments of the invention, at least some of the visible elongate features of said multiplicity of visible elongate features may be defined, at least in part, by the shape of the window apertures or parts thereof.

The elongate features are preferably spaced apart from the window apertures. For example, where there are at least two elongate features between a pair of adjacent window apertures, the distance between adjacent elongate features may be less than the distance between the window aperture and the nearest elongate feature. The elongate features may be regularly interspersed amongst the window apertures. The number and length of the elongate features may be such that the sum length of all of the sloping elongate features that slope in one direction divided by the number of window apertures equals a length greater than 10% of the height of the side wall. In the case where the side wall comprises window apertures, there may be more than two elongate features between each pair of adjacent window apertures.

Each elongate feature may form part of a larger feature. The larger feature may for example comprise parts that are not elongate, do not extend from a lower portion to an upper portion and/or do not slope relative to said notional line. In a case where the elongate feature forms part of such a larger feature, it is believed that the person skilled in the art would readily be able to ascertain the start and end of the elongate feature. If however, the start and/or end of the elongate feature is not immediately apparent it may be defined as the point of transition between a region of the larger feature that is visible, non-horizontal, and slopes relative to said notional line to a region that is not. It will be appreciated from the foregoing that the ends of the elongate feature need not terminate but may instead meet another feature such that the ends of the elongate feature are not readily discernable. Each end of an elongate feature may alternatively or additionally be defined as either a point at which the elongate feature terminates or the point at which that portion of the feature is no longer able to be considered sloping relative to said notional line. Notwithstanding the foregoing optional definitions, the skilled person will not identify an elongate feature within a larger feature, if the elongate feature forms only a negligible part of the larger feature. For example, the rounded corners of the chine lines 118 of the prior art arrangement shown in FIG. 1b, or smaller portions thereof, would not be considered as sloping elongate features as required by the present invention.

Thus, a single larger feature may comprise a plurality, for example two only, of the elongate features.

The larger feature may comprise an elongate feature that is substantially parallel to said notional line. The larger feature may start at a lower end and extend upwards to an upper end and may comprise both a single sloping elongate feature as required by the present invention and at least one elongate feature that is substantially parallel to said notional line. The larger feature may comprise a horizontal elongate feature.

The larger feature may comprise both a horizontal elongate feature and an elongate feature that is substantially parallel to said notional line. The larger feature may be in the form of an endless line. The larger feature may for example extend around at least part of a window aperture defined in the side wall. Such a larger feature may of course surround completely the window aperture. The larger feature may surround, but be spaced apart from, the window aperture. Each larger feature may include a lower part and an upper part, the lower part being substantially parallel to said notional line and the upper part comprising the elongate feature. The length of the part of the larger feature that comprises the sloped elongate feature is preferably greater than 5%, more preferably greater than 10%, and yet more preferably greater than 15%, of the entire length of the larger feature. The larger feature may comprise at least two elongate features (preferably adjacent elongate features) of said multiplicity of elongate features. One of the elongate features may differ in shape or size from the other of the elongate features of the larger feature. For example, one of the elongate features may slope to a greater degree than another of the elongate features. For example, the foremost of the two elongate features may slope more than the rearmost elongate feature. Having varying degrees of sloping of the elongate features may make the provision of such features as part of a larger feature surrounding a window aperture easier in certain types of fuselage interior designs, for example where panel joints might define boundaries across which it would be preferable for elongate features not to cross. The larger feature may comprise an upper elongate feature which extends in a substantially horizontal direction and which joins the top ends of the two upright elongate features. Similarly, there may be a lower elongate feature, extending in a substantially horizontal direction, which joins the lower end of the two sloping, and substantially upright, elongate features.

In the case where there are two (or at least two) elongate features between each pair of adjacent window apertures, the two elongate features may slope relative to said notional line in the same direction along the length of the fuselage. Also, the two elongate features may be positioned at substantially the same height above the horizontal (as defined for example by the base of the side wall, which when installed will typically be level with or parallel to the floor of the cabin).

The side wall may include a section comprising a plurality of the sloped elongate features, the section being greater than five meters in length and having a height greater than 75% of the height of the side wall, wherein the sum length of the sloped elongate features in the section divided by the area covered by the section is preferably greater than $0.1\ m^{-1}$. The sum length of the sloped elongate features in the section divided by the area covered by the section may be greater than $0.2\ m^{-1}$, and may even be greater than $0.5\ m^{-1}$.

Each elongate feature may be so shaped that its ends are separated by a distance that is less than 90% of the height of the side wall in the vicinity of the elongate feature. Thus, the elongate feature need not necessarily extend from the bottom of the side wall to the top of the side wall. One end, and preferably both ends, of each elongate feature may be separated from the top and bottom of the side wall. In the case where the elongate feature forms a part of a larger feature it is also preferred that such a larger feature has a uppermost portion and a lowermost portion that are separated by a distance that is less than 90% of the height of the side wall (as measured in the vicinity of the elongate feature). It will be appreciated that in relation to this aspect of the invention the distance between the two opposite ends of the elongate feature may be measured as the straight line distance in space between the two points. The height of the side wall may be similarly determined as the straight line distance between the uppermost and lowermost points of the side wall in the region of the elongate feature.

The side wall may comprise a multiplicity of panels. Each panel may comprise one, and preferably two, (and possibly more than two) of the elongate features of said multiplicity of elongate features. The panels may be joined by means of joints. The joints may extend substantially parallel to said notional line. The joints are preferably less visually prominent than the elongate features. The joints between panels may be separate and distinct from the sloping elongate features. Alternatively, the elongate features may be defined by such joints, at least in part. Each panel may be associated with a respective window aperture. A plurality of window apertures may be provided in each panel. Each window aperture may be associated with one panel only. The joints between adjacent panels are preferably aligned with a structural element. The structural element may for example form part of the frames of the aircraft.

In certain embodiments of the invention, the visual effect may be achieved without using elongate features. For example, a pattern of dots on the wall may be sufficient to cause the passenger to perceive differently the degree of inward sloping of the side wall. Thus, the invention further provides an aircraft fuselage interior comprising a section (for example an upper section of a side wall) that slopes inwardly, the visual appearance (for example, the shape) of the section being so arranged and configured that the section, when viewed from the centre of the fuselage in a direction towards either the fore or the aft of the aircraft, appears to have a degree of inward sloping less than the actual degree of inward sloping. The inwardly sloping section may of course comprise a multiplicity of visible, preferably elongate, features arranged along the length of the side wall, the arrangement of the features providing the optical illusion of the degree of inward sloping of the wall being less than it actually is. The visual effect may be unidirectional in that the section may appear to have a degree of inward sloping less than the actual degree of inward sloping, when viewed from the centre of the fuselage in a direction towards the fore of the aircraft, but not when viewed from the centre of the fuselage in a direction towards the aft of the aircraft. As passengers tend to remain seated during flight and seats tend to face forwards, such a unidirectional visual effect may still be of advantage.

The present invention further provides an aircraft fuselage interior comprising a side wall that extends in a direction along the length of the fuselage, the wall including a section comprising a plurality of visible elongate features arranged along the length of the side wall, the section being greater than five meters in length and having a height greater than 75% of the height of the side wall, wherein each elongate feature comprises a sloped portion, the sum length of the sloped portions in the section divided by the area covered by the section being greater than $0.1 \text{ m}^{-1}$.

The present invention also provides an aircraft including a fuselage having an interior according to any aspect of the present invention described herein. The fuselage interior of the aircraft may of course include seats. The aircraft may alternatively be provided without seats, such seats being able to be fitted later. The aircraft may be a single aisle aircraft. The aircraft may be a multi-deck aircraft. In such a case the fuselage interior may be that of the upper deck of the aircraft. The perception of lack of cabin space is, it is believed, of greater relevance in respect of single aisle aircraft or in the upper deck of a multi-deck aircraft, because in such cases the angle of sloping of the side walls defining the aircraft fuselage interior is likely to be greater.

The present invention also provides a wall for an aircraft fuselage interior according to any aspect of the present invention described herein. Thus, the wall may include the multiplicity of visible elongate features. The wall may for example also comprise a multiplicity of apertures for forming the window apertures of the aircraft fuselage interior. The wall may of course be defined by means of a multiplicity of panels. Thus, the present invention further provides a panel for an aircraft fuselage interior according to any aspect of the invention described herein where the side wall is defined by means of panels. The panel may for example comprise at least one aperture for forming one of the window apertures. The panel may comprise as least one visible elongate feature for forming one of the multiplicity of visible elongate features.

The present invention further provides a side wall for forming part of an aircraft fuselage interior. The side wall may thus include a sloping upper section and a multiplicity of visible elongate features arranged along the length of the side wall. Each elongate feature may extend from a lower portion to an upper portion and slope relative to a notional line defined by the intersection of the side wall and a plane whose normal axis is parallel to the length of the side wall.

The present invention further provides a side wall panel for forming part of an aircraft fuselage interior. The side wall panel may thus include a sloping upper section and at least one visible elongate feature extending from a lower portion to an upper portion and sloping relative to a notional line defined by the intersection of the side wall panel and a plane whose normal axis is parallel to the length of the side wall panel. The present invention yet further provides a kit of parts comprising a multiplicity of such panels. The panel (or in cases where there are many panels, each panel) may include a portion that in the assembled side wall defines at least part of a window aperture.

In the present specification the term "multiplicity" is used in various contexts. At its broadest, the term "multiplicity" may simply mean three or more. In certain embodiments of the invention, the term could be interpreted as meaning as many as ten or more.

It will of course be appreciated that features described in relation to one aspect of the present invention may be incorporated into other aspects of the present invention. Thus the panel of the present invention may include any of the features described in relation to the panels that may be used to form the side wall of the aircraft fuselage interior of the present invention.

DESCRIPTION OF THE DRAWINGS

Embodiments of the present invention will now be described by way of example only with reference to the accompanying Figures of which:

FIG. 2*a* shows a side view of an aircraft fuselage interior according to a first embodiment of the present invention;

FIG. 2*b* shows an enlarged part of FIG. 2*a*,

FIG. 5*a* shows a cross-sectional view of a panel joint of the prior art;

FIG. 5*b* shows a cross-sectional view of a panel joint of the first embodiment of the present invention;

FIG. 5*c* shows a cross-sectional view of a panel joint of a second embodiment of the present invention;

DETAILED DESCRIPTION

Figure 1A:
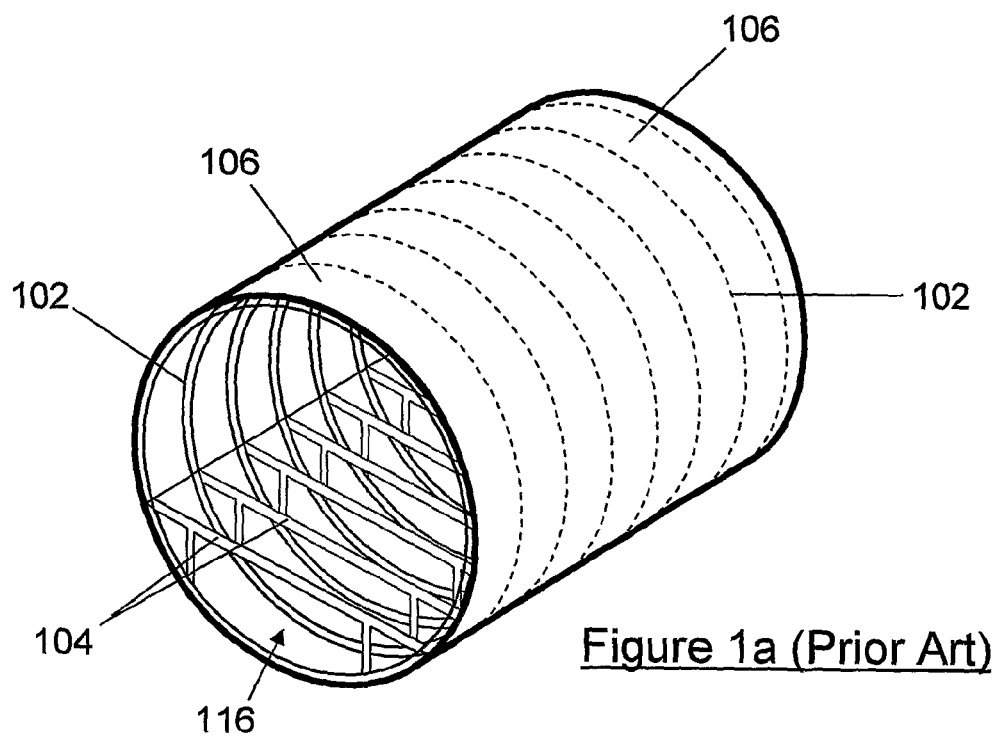
FIGS. 1*a* and 1*b* show a partial cut-away view of a fuselage interior according to the prior art.

FIG. 2*a* shows a side view from inside the fuselage of an aircraft according to a first embodiment of the present invention (some of the seats have been removed from the view shown for the sake of clarity). FIG. 2a shows an interior side wall 10 of the fuselage interior extending upwardly from the floor 8. The general construction of the fuselage interior is similar to that of the interior shown in FIG. 1b. Thus, the side wall 10 is defined by interior panels 12, each panel including a window aperture 14, the panels being joined by means of panel joints 20. The panel joints 20 run parallel to a notional line 24 on the side wall defined by the intersection of the interior surface of the side wall and a plane whose normal axis is parallel to the length of the fuselage.

Figure 1B:
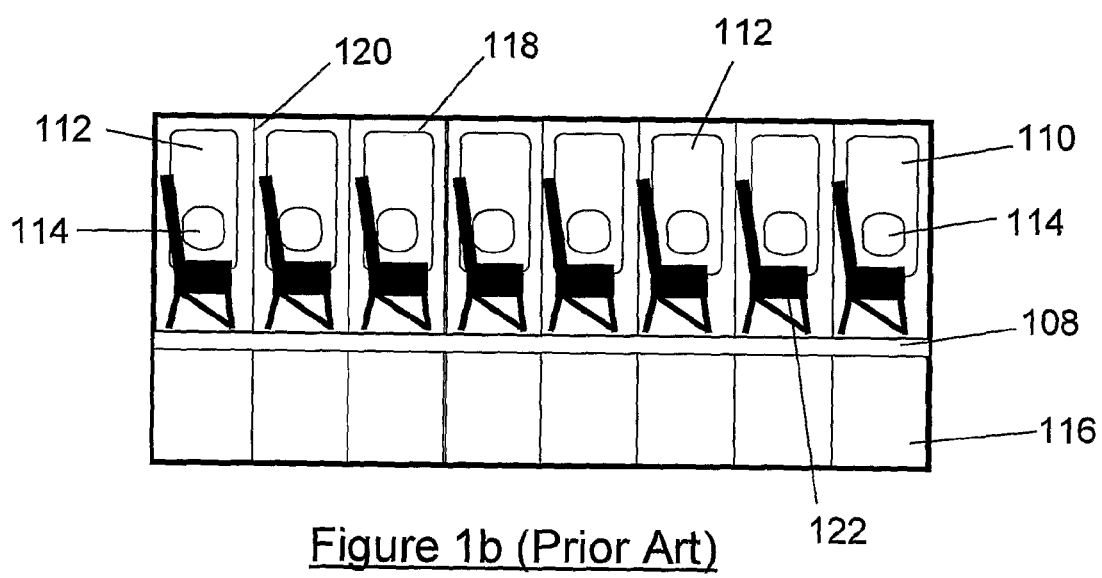

There are two important differences between the fuselage interior shown by FIG. 2a and that shown by FIG. 1b. Firstly, the panel joints 20 are less visually prominent. The means for achieving this and the reason for this are explained later. Secondly, it will be noted that the chine line 18 around each window aperture 14 slopes towards the rear of the aircraft; that is, in the opposite direction to the direction in which the seats are facing. FIG. 2b is an enlarged view of the chine line 18 around the window aperture 14 and shows that the chine line 18 (as resolved in this direction of viewing) includes fore and aft generally upright lines 18a, 18b which are joined at their upper ends by an upper elongate line 26 and are joined at their lower end by a lower elongate line 28. The four lines 18a, 18b, 26 and 28 together define the chine line 18 that extends around, and is spaced apart from, the window aperture 14 to completely surround it. The fore upright line 18a includes a vertical portion 32a (vertical in the view shown in FIG. 2a) that extends from the lower elongate line 28 up to a midway point 30b and a sloping line 34 that extends upwardly from the midway point 30b to the upper elongate line 26. The top 30a of the sloping line 34 is set rearwards from the bottom of the sloping line by a distance of about 300 mm. The sloping line 34 has a length of about 670 mm and the shape defined by the chine line 18 has a height of about 1.2 m and a maximum width of about 600 mm. The angle of sloping of the line 34 relative to the notional line 24 progressively increases with height up the side wall 10 from 0 degrees to the line 24 to about 40 degrees and has an average angle of sloping of about 27 degrees. The side wall has a height H of about 1.8 m. It will be appreciated that the terms such as "vertical" and "sloping" as used in the foregoing description refer to the geometric orientation of the lines as seen in the view of FIGS. 2a and 2b. The "vertical" lines are only shown as vertical in FIGS. 2a and 2b as a result of the direction of viewing. In three dimensions, such vertical lines run parallel to the notional line 24.

The aft upright line 18b includes a vertical portion 32b (vertical in FIG. 2b) that extends from the lower elongate line 28 up to the bottom of an aft sloping line 36 that extends upwardly to the upper elongate line 26. The aft line 36 has a degree of sloping that is less than the fore line 34 in that the sloping of the line 36 is such that the line 36 does not cross the panel joint 20. The top of the aft sloping line 36 is set rearwards from the bottom of the sloping line 36 by a distance of about 80 mm. The sloping line 36 has a length of about 650 mm. The angle of sloping of the line 36 relative to the notional line 24 progressively increases with height up the side wall 10 from 0 degrees to the line 24 up to a maximum of about 10 degrees just beneath the upper elongate line 26. The average angle of sloping is about 7 degrees. It will be noted that the corners at which the four lines 18a, 18b, 26, 28 that define the chine line 18 meet may be rounded so that there is not a sharp transition from one line to the next. The sloping lines 34, 36 of each chine line 18 of the window apertures 14 define a multiplicity of visible elongate features that slope relative to the notional line 24. The side wall thus includes a multiplicity of substantially upright lines that slope in the same direction (i.e. generally towards the rear of the aircraft), the lines being regularly interspersed between the window apertures.

Whilst not discernable from the view shown in FIG. 2a or 2b, the side wall 10 slopes relative to the vertical plane that contains the axis of the fuselage. Thus, the side wall includes a lower section, which slopes with progressively increasing angle to the vertical with increasing distance downwards, that lower section corresponding to that part of the lower half of the fuselage cross-section that is above the level of the floor 8. The side wall 10 also includes an upper section corresponding to the upper half of the fuselage cross-section that slopes with progressively increasing angle to the vertical with increasing distance upwards.

Figure 3:
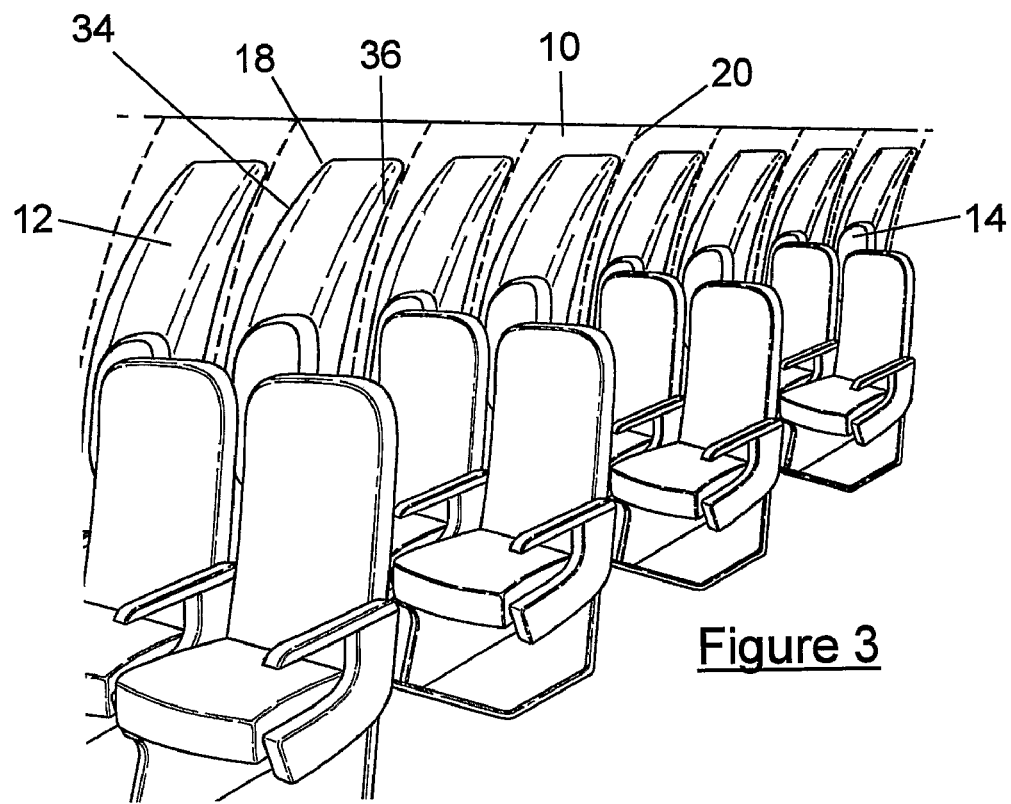
FIG. 3 shows a perspective view of the first embodiment illustrated by FIG. 2*a* looking towards the rear of the fuselage.
Figure 4:
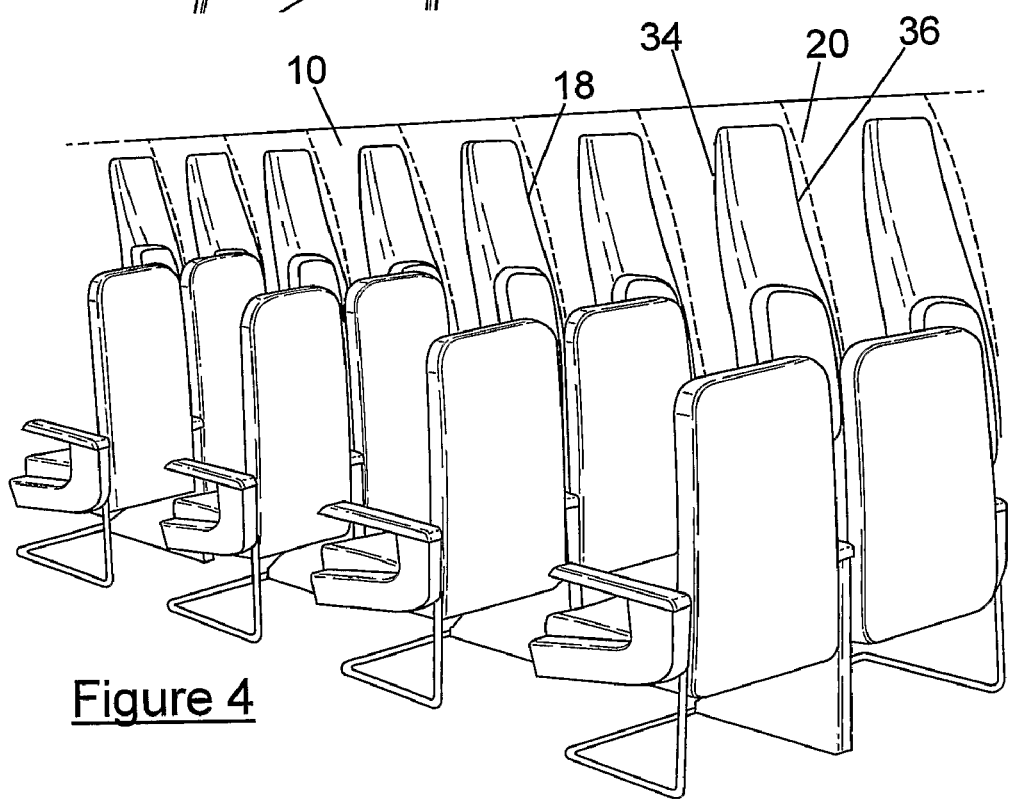
FIG. 4 shows a perspective view of the first embodiment illustrated by FIG. 2*a* looking towards the front of the fuselage.

FIGS. 3 and 4 show as schematic perspective views the fuselage interior shown in FIG. 2a. FIG. 3 shows a view looking towards the rear of the fuselage (i.e. in the opposite direction to that of the typical viewpoint of a passenger). In this direction of viewing, the sloping of the sloping lines 34, 36 tends to accentuate the sloping of the side wall 10 into the interior of the fuselage. FIG. 4, on the other hand, shows a view looking towards the front of the fuselage (i.e. in the same direction as that of the typical viewpoint of a passenger). In this direction of viewing, the sloping of the sloping lines 34, 36 tends to cause the passengers to perceive a lesser sloping of the side wall 10 into the interior of the fuselage. This effect can be explained by considering that lines that are parallel to the notional line 24 (such as for example the panel joints 20, the positions of which being shown by the broken lines in FIGS. 3 and 4) allow a passenger to readily perceive the shape, and therefore the degree of inward sloping, of the interior wall 10. Reducing the presence or visibility of such lines (20), by for example providing sloping lines 34, 36 that disrupt the passengers perception of such lines (20), can alter the passengers' perception of the degree of inward sloping of the interior wall 10. Moreover, the combination of the progressive sloping of the sloping lines 34, 36, the sloping of the side wall 10 towards the vertical, and the perspective effect, when viewed by a seated passenger (see for example the view shown in FIG. 4), has the visual effect of reducing the perceived sloping of the chine lines 18; that in turn reduces the perceived sloping of the side wall 10 into the cabin, which in turn causes an optical illusion by which the cabin space appears to be wider than it actually is. It will be noted that the panel joints 20 (shown in FIGS. 3 and 4 as dotted lines), which are parallel to the notional line 24, would if clearly visible provide the passenger with the visual clues as to the true degree of inward sloping of the side wall. Because the panel joints 20 are much less visually prominent than the sloping upright lines 34, 36, the passengers' perception of the sloping of the internal wall 10 is influenced much more by the sloping upright lines 34, 36.

As mentioned above the panel joints 20 of the embodiment are less visually prominent that in the prior art arrangement and are less visually prominent than the chine lines 18. A cross-section of a panel joint 120 of the prior art is shown in FIG. 5a. The panel joints 120 are in the form of simple lap joints with curved edges. Whilst the gap in the region of the joint 120 may be hidden from view at shallow angles of viewing (such as the viewing direction 138 shown in the broken line image of FIG. 5a), the joint is readily visible over a large range of viewing angles (such as viewing direction 140). The panel joint 20 used in the first embodiment, as shown in FIG. 5b, is less visually prominent from a wider range of viewing angles. The join on the interior surface is smoother, there is no large gap defined between adjacent panels and the arrangement is such that the interface between the panels is less visible in the direction of viewing towards the front of the aircraft (looking from left to right in FIG. 5b) than when viewed in the opposite direction. FIG. 5c shows an alternative panel joint design 220 in accordance with a second embodiment of the invention, the cabin interior otherwise being identical to the first embodiment.

Figure 6B:
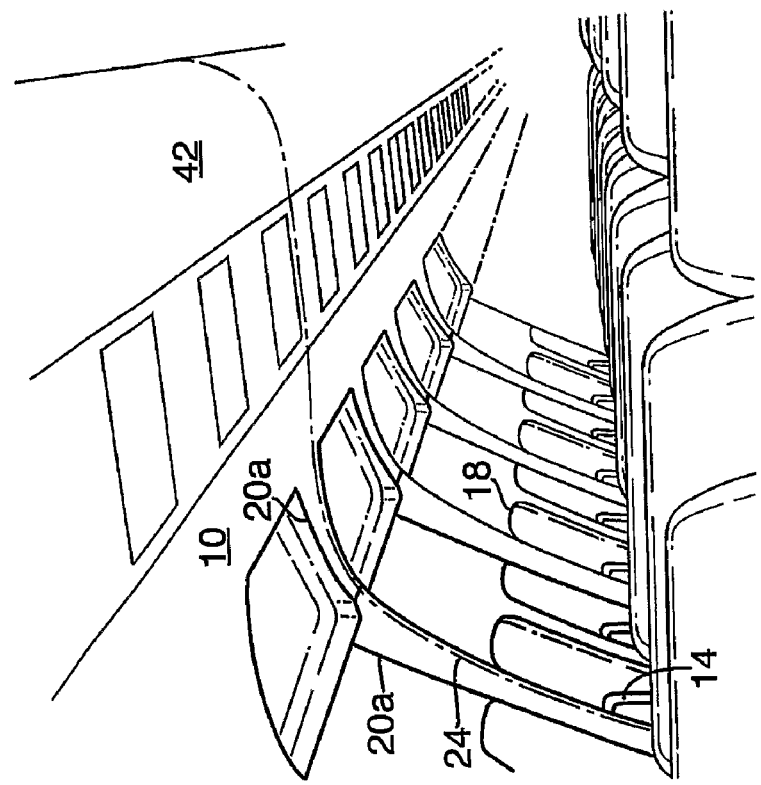
FIG. 6*b* shows a perspective view of an aircraft fuselage interior according to a third embodiment of the present invention.
Figure 6A:
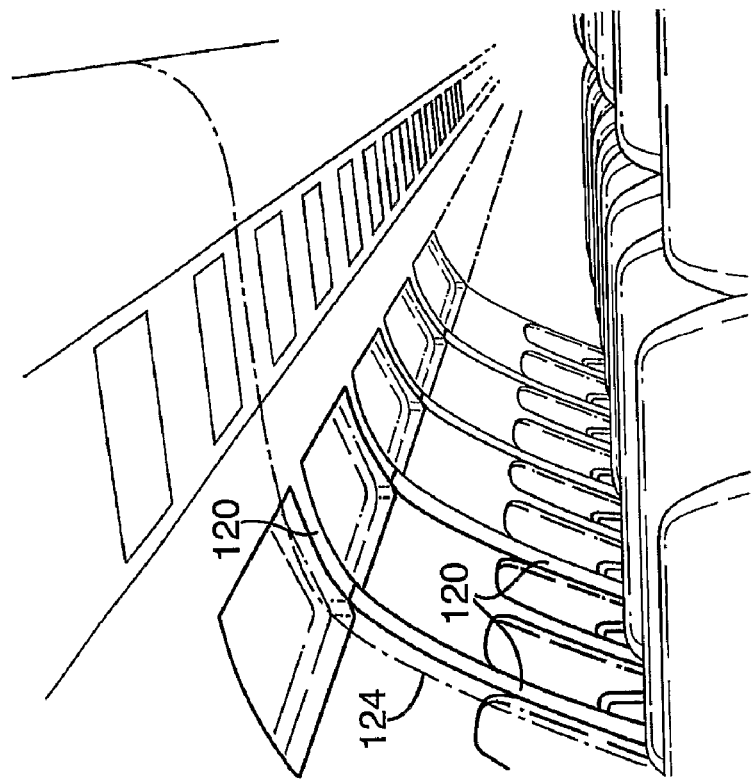
FIG. 6*a* shows a perspective view of an aircraft fuselage interior according to a prior art arrangement.

FIGS. 6a and 6b illustrate a prior art arrangement and a third embodiment of the invention, respectively. FIG. 6a illustrates a cabin interior of the prior art comprising panel joints 120 that are substantially parallel to the notional line 124 (a notional line defined by the intersection of the interior surface of the side wall 110 and a plane whose normal axis is parallel to the length of the fuselage). FIG. 6b shows a modification, in accordance with the third embodiment, of the cabin interior of FIG. 6a. It will be noted that the panel joints 20 have been modified such that the aft edge 20a of the panel joint slopes rearwards away from the fore edge of the joint (the fore edge remaining substantially parallel to the notional line 24), both on the portion of the side wall 10 in the region of the window aperture 14 and the portion of the side wall 10 in the region of the overhead luggage bins 42. If the panel joints 20 of FIG. 6b were viewed in a horizontal direction transverse to the axis of the fuselage, the fore edge would appear to extend vertically, whereas the aft edge 20a would appear as a curved line sloping rearwards with progressively increasing angle of sloping with increasing height. In contrast, when viewed in the direction of viewing of a seated passenger (the view shown in FIG. 6b), the aft edge 20a of the joint 20 appears to be relatively straight, as a result of perspective and the side wall 10 curving inwardly with increasing height. The aft line 20a having the appearance of a substantially straight line causes the passenger to perceive the inward sloping of the side wall 10 to be less (as can be seen by comparing the images of FIGS. 6a and 6b). It is believed that features such as lines that are perceived as straight in a given viewing direction have a significant affect on the perception of the viewer as regards the inward sloping of the side wall 10. It is thought that the mind is caused to correlate the apparently straight line of the aft edge 20a of the panel joint 20 with the inward sloping of the side wall. Thus, whilst the angle of inward sloping progressively increases with height (the wall curves inwards), the two sloping lines 20a, which are perceived by the passenger as straight lines, might cause the passenger to perceive the angle of sloping of the side wall 10 to be constant along the regions where the lines 20a appear to be straight. The chine lines 18 around the window apertures 14 of the third embodiment are substantially identical to the chine lines of the prior art arrangement of FIG. 6a.

Figure 7:
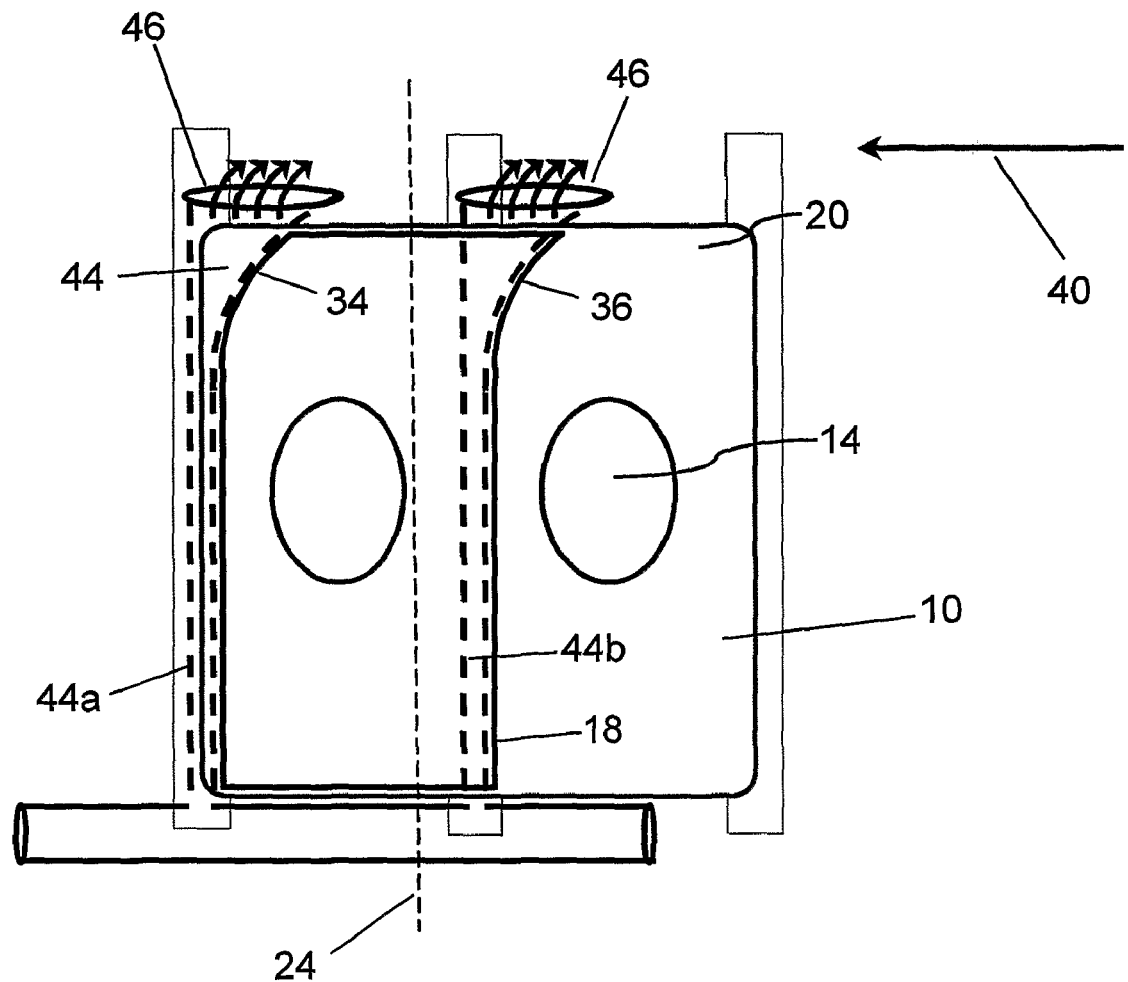
FIG. 7 shows a side view of an aircraft fuselage interior according to a fourth embodiment of the present invention.

FIG. 7 shows a fourth embodiment of the invention where the sloping features providing the visual illusion of extra space are provided by means of configuring the air conditioning ducts 44 to have edges that slope relative to the notional line 24, the sloping of such edges being visually prominent on the side wall 10. The front of the aircraft is in the left direction in FIG. 7 and so the direction 40 of viewing of a seated passenger is towards the left. FIG. 7 shows a fore duct 44a and an aft duct 44b (shown in broken lines in FIG. 7), which are both covered by a single wall panel 20. The ducts 44 comprise air conditioning outlets 46 that are located above the top of the panel 20. It will be seen that in this embodiment the panel 20 spans across two window apertures 14. The panel 20 includes a chine line 18 that follows the contours of the ducts 44 behind the panel. The chine line 18 thus includes fore and aft sloping lines 34, 36 corresponding to the sloping parts of the fore and aft ducts 44a, 44b. It will also be seen the part of the chine line 18 that extends downwards from the end of each sloping line 34, 36 is substantially parallel to the notional line 24. The fore and aft sloping lines 34, 36 are positioned near the top of the side wall 10 and have a substantially similar progression of sloping with height up the wall 10 relative to the notional line 24. Only one sloping line is located between each pair of adjacent window apertures. The sloping lines 34, 36 provide the optical illusion that the upper section of the side wall, when viewed by a passenger in direction 40, appears to have a degree of inward sloping less than the actual degree of inward sloping. The fuselage interior may thus seem to the passenger to be larger than it actually is.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Surface decoration may be added in order to enhance the visual illusion of extra space, for example, to enhance the visibility of the sloping lines that produce the optical illusion or by reducing the visibility of lines or features that enable the passenger to perceive readily the actual degree of sloping (such as disrupting the visibility of lines that run parallel to the notional line defined by the intersection of the interior surface of the side wall and a plane whose normal axis is parallel to the length of the fuselage). Lighting effects may similarly be used to good effect. Embodiments of the invention may provide the benefits of the optical illusion solely by means of such surface decoration and/or lighting effects.

Whether or not a passenger will perceive a cabin interior differently as a result of the implementation of an embodiment of the present invention may be considered as being rather subjective. However, it is believed that an aircraft interior designer will be familiar with passengers' perceptions of space and that therefore the average designer of the art will readily be able to distinguish between cabin interior designs that provide the optical illusion of there being more space (or less inward sloping of the cabin side walls) and those that do not.

In the event of doubt over whether a particular embodiment of the invention provides a different visual appearance that makes the side wall of the cabin appear to slope in less than actual amount of sloping, a survey could be conducted. For example, a random sample of a statistically valid number (say, 100) of adult passengers could be conducted to assess whether a particular cabin design has walls that appear to have a degree of inward sloping less than the actual degree of inward sloping. Such a study could be conducted by asking each passenger to compare a first cabin interior having sloping features embodying the present invention and a second similar cabin interior without any such sloping features, but including visible lines enabling the passenger to readily perceive the degree of inward sloping of the cabin side walls. Such lines could for example include lines parallel to the intersection of the interior surface of the side wall and a plane whose normal axis is parallel to the length of the fuselage. For example, the lines defined by the panel joints 120 shown in FIGS. 1a and 1b allow the passenger to readily perceive the degree of inward sloping of the cabin side walls. Each passenger should then be asked whether the second cabin design (not embodying the invention) has side walls that slope more, less, or the same as the side walls of the first cabin design (embodying the invention) and be attributed a score according to his/her answer (+1 for slopes in more, 0 for slopes the same, and −1 for slopes in less). It will be appreciated that the greater the score, the stronger the optical effect of the embodiment of the invention. A sum score of a sample of 100 answers of greater than 25 can be assumed to be indicative of the inwardly sloping section of the side wall of the embodiment of the invention appearing to have a degree of inward sloping less than the actual degree of inward sloping. A sum score of a sample of 100 answers of 0 or less (for example conducted in respect of a first side wall not embodying the invention compared with a second similar side wall including visible lines enabling the passenger to readily perceive the degree of inward sloping of the wall) can be assumed to be indicative that the inwardly sloping section of a side wall does not appear to have a degree of inward sloping less than the actual degree of inward sloping. Therefore a score of 25 or more can be considered as a sufficient, but not necessary, condition of ascertaining whether the degree of inward sloping of a wall appears less than the actual degree of inward sloping. It is believed that only in borderline cases would a survey such as that described above be necessary, because the skilled addressee should readily be able to recognise those cabin interior designs that create a visual appearance of less inward sloping of the cabin side walls as compared with those designs of cabin interiors that do not.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An aircraft fuselage interior comprising a side wall with an interior surface that extends in a direction along the length of the fuselage and includes an upper section that slopes inwardly, wherein
the side wall includes a multiplicity of window apertures arranged along the length of the fuselage, and a multiplicity of visible elongate elements arranged along the length of the interior surface of the side wall, the arrangement of the elongate elements being such that:
each elongate element is spaced apart on the interior surface of the side wall from the window apertures, and positioned above the average level of the tops of the window apertures,
each elongate element extends from a lower portion to an upper portion, wherein, with increasing distance upwards along each elongate element, the interior surface of the side wall progressively slopes inwards,
each elongate element slopes longitudinally either fore or aft relative to a notional line defined by the intersection of the interior surface of the side wall and a plane whose normal axis is parallel to the length of the fuselage, and
wherein either i) the average angle of sloping of the visible elongate elements in one longitudinal direction on the interior surface of the side wall is greater than the average angle of sloping of the visible elongate elements in the opposite longitudinal direction on the side interior surface of the wall, or ii) the number of visible elongate elements on the interior surface of the side wall that slope in one longitudinal direction is greater than the number of elongate elements on the interior surface of the side wall that slope in the opposite longitudinal direction, or iii) those elongate elements sloping in one longitudinal direction on the interior surface of the side wall are given greater visual prominence than those elongate elements sloping in the opposite longitudinal direction,
and wherein the effect of the sloping of all such visible elongate elements present on the interior surface of the side wall is such that the inwardly sloping section of the interior surface of the side wall, when viewed from the centre of the fuselage in a direction towards either the fore or the aft of the aircraft, appears to have a degree of inward sloping less than the actual degree of inward sloping, and wherein the effect of the sloping is greater in one direction than the other.

2. An aircraft fuselage interior according to claim 1, wherein, in respect of each elongate element of said multiplicity of visible elongate elements, the angle of sloping of each elongate element relative to said notional line progressively increases along the majority of the length of the elongate element that lies on the upper section of the side wall.

3. An aircraft fuselage interior according to claim 1, wherein, in respect of each elongate element of said multiplicity of visible elongate elements, the angle of sloping of the elongate element relative to said notional line increases as the angle of sloping of the side wall towards the vertical plane increases.

4. An aircraft fuselage interior according to claim 1, wherein the fuselage interior includes a multiplicity of seats facing the same direction along the length of the fuselage and the lower portion of the elongate element of each of said multiplicity of visible elongate elements is forward, in the direction of the seats, of the upper portion.

5. An aircraft fuselage interior according to claim 1, wherein the elongate elements are defined at least in part by means of the shape of the wall.

6. An aircraft fuselage interior according to claim 5, wherein each elongate element is defined by a change in gradient of the wall surface.

7. An aircraft fuselage interior according to claim 1, wherein the elongate elements are interspersed between the windows.

8. An aircraft fuselage interior according to claim 7, wherein there are at least two elongate elements between each pair of adjacent window apertures.

9. An aircraft fuselage interior according to claim 8, wherein said at least two elongate elements slope relative to said notional line in the same direction along the length of the fuselage.

10. An aircraft fuselage interior according to claim 8, wherein one of the two elongate elements slopes to a greater degree than the other of the two elongate features.

11. An aircraft fuselage interior according to claim 1, wherein the average length of the elongate elements is greater than 80% of the average height of the window apertures.

12. An aircraft fuselage interior according to claim 1, wherein each elongate element forms part of a larger element.

13. An aircraft fuselage interior according to claim 12, wherein the larger element extends around at least part of a window aperture.

14. An aircraft fuselage interior according to claim 1, wherein the wall comprises a multiplicity of panels.

15. An aircraft fuselage interior according to claim 14, wherein the multiplicity of panels includes panels joined by means of joints, which lie substantially parallel to said notional line, and which are less visually prominent than the elongate elements.

16. An aircraft fuselage interior according to claim 14, wherein the interface between at least two adjacent panels is less visible in one direction of viewing than in the opposite direction.

17. An aircraft including a fuselage having an interior according to claim 1.

18. An aircraft according to claim 17, wherein the aircraft is a single-aisle aircraft.

19. An aircraft according to claim 17, wherein the aircraft is a multi-deck aircraft and the fuselage interior is that of the upper deck of the aircraft.

20. A side wall for an aircraft fuselage interior according to claim 1.

21. A panel for an aircraft fuselage interior according to claim 14.

22. A kit of parts for assembling a side wall for an aircraft fuselage, the kit comprising a multiplicity of panels according to claim 21.

* * * * *